United States Patent [19]

Szczepanek

[11] 4,300,405
[45] Nov. 17, 1981

[54] CENTRAL GUIDE MEANS FOR THE PISTON OF A RECIPROCATING PISTON MACHINE

[75] Inventor: Udo Szczepanek, Eichenau, Fed. Rep. of Germany

[73] Assignee: Bauer Kompressoren, GmbH, Munich, Fed. Rep. of Germany

[21] Appl. No.: 130,833

[22] Filed: Mar. 17, 1980

[30] Foreign Application Priority Data

Apr. 5, 1979 [DE] Fed. Rep. of Germany ....... 2913688

[51] Int. Cl.³ ............................................. F16H 21/22
[52] U.S. Cl. ........................................... 74/44; 74/51
[58] Field of Search ........................ 74/40, 43, 44, 51

[56] References Cited

U.S. PATENT DOCUMENTS

| | | | |
|---|---|---|---|
| 383,764 | 5/1888 | Pitt | 74/44 |
| 1,471,847 | 10/1923 | Holliday | 74/44 X |
| 2,487,003 | 11/1949 | Trahin | 74/44 |

FOREIGN PATENT DOCUMENTS 445033  5/1927  Fed. Rep. of Germany .......... 74/44

*Primary Examiner*—Lawrence J. Staab
*Attorney, Agent, or Firm*—Hauke & Patalidis

[57] ABSTRACT

Central guide means for the piston rod of apparatus provided with a piston reciprocating in a cylinder and comprising a piston rod centrally journaled proximate its free end between two journaling points of a guide lever, the guide lever being essentially oriented in the axial direction of the cylinder and being journaled at two journaling points on a pair of connecting rods of equal length. Fixed pivoting shafts are disposed parallel to each other and spaced equidistantly on opposite sides of a longitudinal axis of the cylinder, the pivoting shafts being coupled to the connecting rods and separated relative to the longitudinal axis of the cylinder by a distance corresponding to the distance between the journaling points of the guide lever.

10 Claims, 5 Drawing Figures

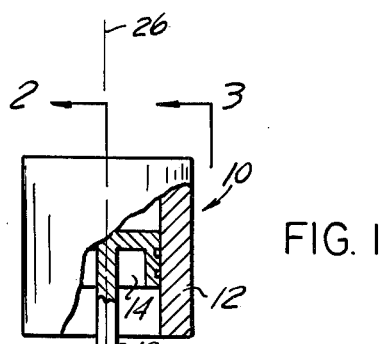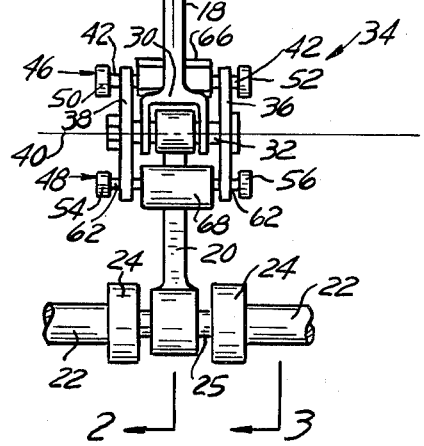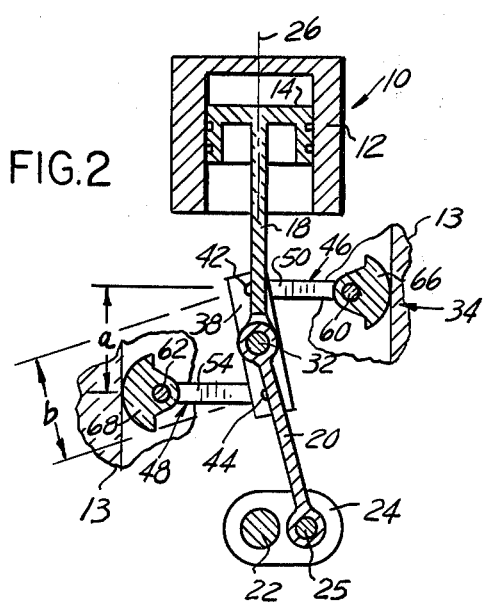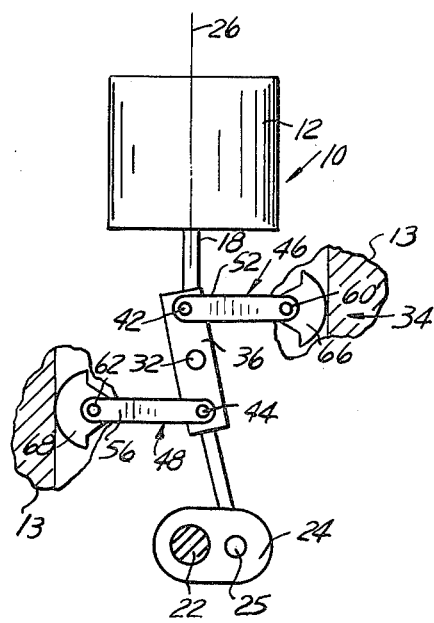
FIG. 1
FIG. 2
FIG. 3

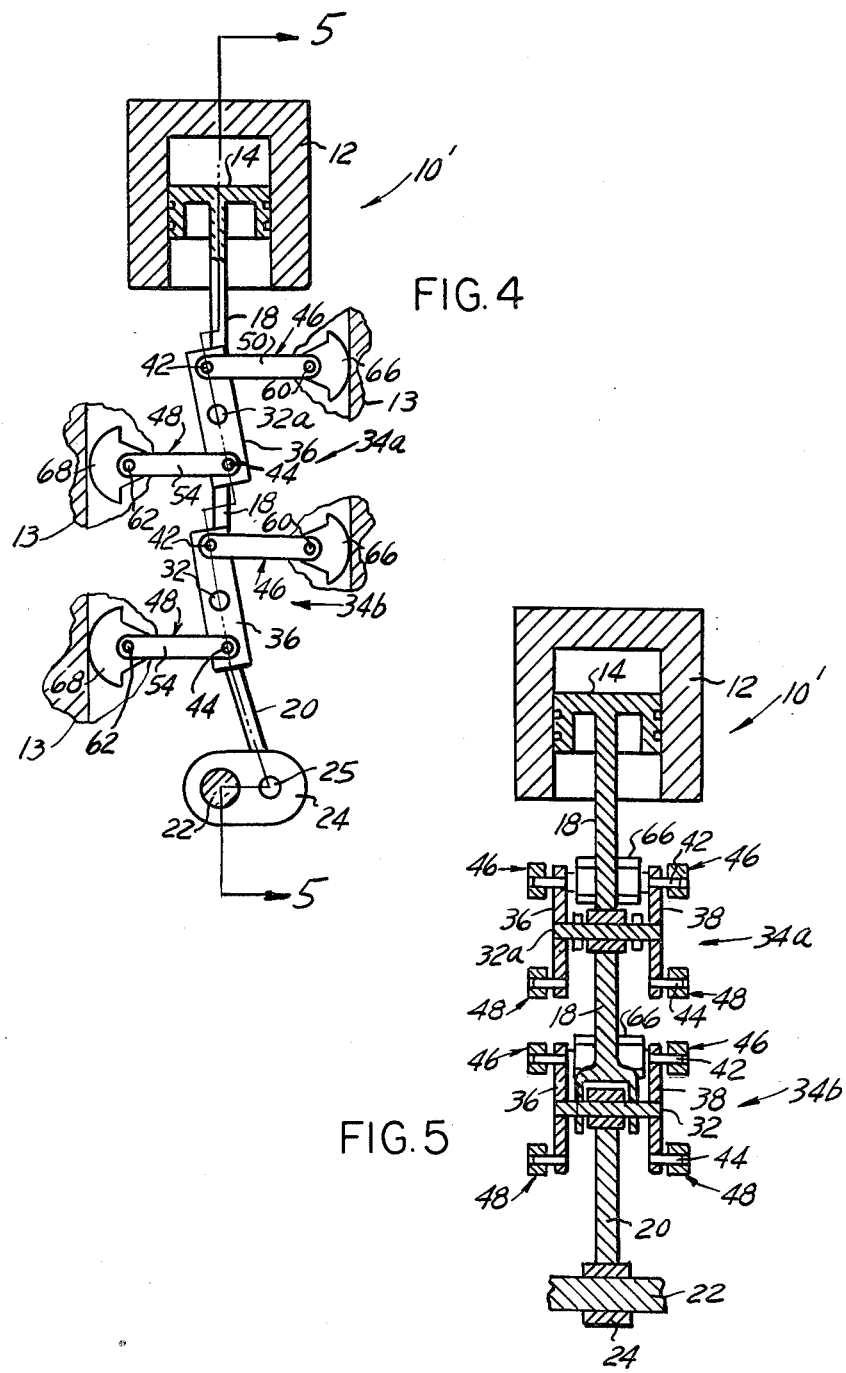

CENTRAL GUIDE MEANS FOR THE PISTON OF A RECIPROCATING PISTON MACHINE

BACKGROUND OF THE INVENTION

The invention relates to a central guide means for the piston rod of reciprocating machines.

It is known in the art to provide the piston rod of a reciprocating piston machine with a central guide means in the form of a guide piston rigidly connected to the piston connecting rod and to which the main connecting rod of the crank mechanism is pivotally attached. Because of the cranking forces transmitted from the main connecting rod to the guide piston, neither tilting movements by the guide piston, even though they be minimal, nor the tendency of the guide piston to shift away from the central axis of the cylinder, can be avoided. Due to the rigid connection between the guide piston and the piston rod, these deflecting movements are transmitted in an undesirable fashion to the main piston, which in turn leads to undue wear. The tilting and transverse movements of the guide piston also have a detrimental effect on the sealing, because the sealing rings must follow the same movements. Therefore, adequate oil wiping action is possible only by means of costly dual rods and by placing the guide piston and the main piston at a considerable distance from each other. In the case of cylinders closed at the bottom, wherein the piston rod is guided through the cylinder bottom cover by means of a packing gland, deformations of the packing gland occur and adequate sealing is impaired to the point where it may lead to leakage to the ambient of the compressed gas.

SUMMARY OF THE INVENTION

It is the object of the present invention to eliminate the shortcomings of the prior art by providing a central guide means for piston rods which permit accurate guiding of the piston rod without deflecting movements, and which requires only minimal installation in the axial direction of the cylinder.

In accomplishing this object, a novel central guide means for the piston rod of a reciprocating machine is provided.

In the central guide means according to the invention, the mid-point of the guide lever between the pivot points describes a path which follows exactly the central axis of the cylinder. Consequently, neither tilting nor transverse forces are transmitted to the piston rod. Moreover, the central guide means according to the invention requires very little space in the longitudinal direction of the cylinder, because the distance between the two points may be kept relatively short. In this basic structure according to the invention, suitable guide elements on the piston are necessary in order to guide the piston within the cylinder itself.

In an improvement of the invention, the piston rod is guided at two points exactly on the central axis of the cylinder, so that the working piston itself need not assume any type of guiding function. Consequently, a significant cause of friction and wear is eliminated. There is no longer cause for concern that the piston skirt will come into contact with the cylinder wall due to excessive wear of the guide rings. In a reciprocating machine provided with such a dual straight-line guide means, a disk-shaped piston may be employed. Another advantage of such a dual straight-line guide means is the fact that machines that are equipped with sealed bearings can be run without crankcase lubrication, resulting in a significant simplification.

Furthermore, this arrangement exhibits good mass balance characteristics. A further improvement of the central guide means is directed to the balancing of inertia forces. By virtue of the good mass balance characteristics which can be obtained with the central guide means in accordance with the invention, the central guide means is particularly suited for use in so-called dual piston machines in which two pistons are attached to the same piston rod. With machines of this type, it has been difficult in the past to resolve the problem of mass balancing because of the inertial forces of the two pistons being always directed in the same direction, and it is for this reason that these machines have not found the wide acceptance that one would expect as a result of their compact construction. With the central guide means according to the instant invention, the mass balancing problem in these machines can be resolved in a most simple manner.

The many other objects and advantages of the present invention will become apparent to those skilled in the art when the following detailed description of the preferred embodiment is read in accompaniment with the attached drawings wherein like reference numerals refer to like components throughout and wherein:

BRIEF DESCRIPTION OF THE DRAWING

FIG. 1 is a schematic side view of an example of a simple central guide means for the piston rod of a reciprocating piston machine according to the present invention;

FIGS. 2 and 3 are partial cross-sectional views of FIG. 1 taken along line 2—2 and 3—3 respectively thereof;

FIG. 4 is a schematic side view of an example of dual straight-line guide means for the piston rod of a reciprocating machine according to the present invention;

FIG. 5 is a partial longitudinal cross-sectional view of the embodiment shown in FIG. 3 taken along line 5—5 thereof.

DETAILED DESCRIPTION OF THE PREFERRED EMBODIMENT

Although the principles of the present invention are applicable to both reciprocating internal combustion engines and reciprocating compressors or pumps, the invention is described hereinafter, for illustrative purpose only, as incorporated in a reciprocating piston compressor or pump. In FIGS. 1-3 the essential elements of a reciprocating piston machine 10 are shown in side view, the machine shown consisting of a cylinder 12 and cylinder block 13, a piston 14 reciprocable in the cylinder 12, a piston rod 18 rigidly connected to the piston 14, a connecting rod 20, a crank shaft 22 and a crank 24 for driving the connecting rod 20 through the crank throw 25. The longitudinal central axis, or center line, through the cylinder 12, which extends vertically with respect to the plane of the drawing, is identified by reference numeral 26. The piston rod 18 is bifurcated proximate its free end 30 and is journaled on the central portion of an axially disposed pivot shaft 32 of a guide assembly 34. The free end of the connecting rod 20 is likewise journaled on the pivot shaft 32. Preferably, the pivot shaft 32 is provided with two side levers 36 and 38, one on each side of the piston rod 18. The longitudinal axis 40 through the pivot shaft 32 lies between an upper pivot point 42 and a lower pivot points 44 of the side levers 36 and 38 at which the guide assembly 34 is pivoted on connecting links 46 and 48 of equal length. The connecting links 46 and 48, too, are preferably provided each with a pair of arms 50–52 and 54–56 respectively. The upper connecting link 46 is pivotally mounted on a shaft 60 held in a fixed position relative to the cyliner and cylinder block 13 whereas the lower connecting link 48 is mounted on a shaft 62 also held in a fixed position relative to the cylinder and cylinder block 13.

The vertical distance a between the shafts 60 and 62 corresponds to the distance b between the pivot points 42 and 44. Also, the shafts 60 and 62 are disposed at equal distances from and located on opposite sides of the longitudinal axis 26. By virtue of this geometrical arrangement of the bearing and pivot points with respect to each other, the center point of the guide lever, that is the axis 40 of the pivot shaft 32, describes a linear path which follows exactly the center line 26 of cylinder 12. In the area of the fixed shaft 60, a balancing weight 66 is mounted on the connecting link 46, and in the area of the fixed shaft 62 the connecting link 48 is provided with a corresponding balancing weight 68. The balancing weights 66 and 68 are disposed on the connecting links 46 and 48 so as to cause upward movement of the weights during downward movement of the connecting links and vice versa, so that vibration free operation of the machine 10 is assured.

In the dual straight-line guide means 10′ shown in FIGS. 4 and 5, like components are identified with the same reference numerals as in FIGS. 1–3. In the structure of FIGS. 4–5 two guide and lever assemblies 34a and 34b are provided, instead of one. Above the guide and lever assembly 34b, which is identical to the guide and lever assembly 34 of FIGS. 1–3, there is provided a second guide and lever system 34a which comprises a second pair of side levers 36–38, and a second pair of connecting links 46–48. The second guide assembly 34a is constructed substantially identical to the guide assembly 34b. The center of the second guide assembly 34a is pivotally connected to the piston rod 18 by a pivot pin 32a. The location of the fixed journal points for the connecting links 46 and 48 and the lengths of the links are such that the second guide assembly 34a assumes a parallel, that is a co-axial position with respect to the first guide assembly 34b. The connecting links 46 and 48 are likewise provided with balancing weights 66–68 (68 not shown in FIG. 5). By virtue of the dual journaling of the piston rod 18, the piston rod 18 is guided, without support by the cylinder 12, on a path which corresponds to the center line 26 of the cylinder, with the cylinder 12 serving no guiding function, thus friction is greatly reduced.

Having thus disclosed the present invention by means of detailed descriptions of examples of structure representing the best mode contemplated for carrying out the invention, modifications whereof being obvious to those skilled in the art, what is claimed as novel is as follows:

1. In a piston machine having a cylinder with a longitudinal central axis, a piston rod reciprocating within said cylinder and having a free end, and a driving rod, central guide means comprising a journaling point along said longitudinal axis, a guide lever coupled at its center to said free end of said piston rod and to said driving connecting rod at said journaling point, said lever being approximately oriented along said longitudinal central axis, a pair of connecting links of equal length, said lever being journaled at two lever journaling points equidistantly spaced on opposite ends of said lever to said connecting links, means fixing the free end of each of said connecting links to one of a pair of fixed points equidistantly spaced and on opposite sides of said longitudinal central axis, said fixed points being separated in the longitudinal axial direction of said cylinder by a distance equal to the distance between said lever journaling points.

2. The central guide means of claim 1 wherein said means fixing said connecting link comprises a pair of fixed pivoting shafts disposed parallel to each other on opposite sides of said longitudinal central axis and equidistantly spaced from said longitudinal central axis, each of said shafts being coupled to one of said connecting links.

3. Central guide means according to claim 1 further comprising an intermediate guide lever disposed at a second journaling point substantially similar to said first guide lever, said second journaling point lying along said central axis, and an intermediate connecting rod extending between said journaling points.

4. Central guide means according to claim 2 wherein said connecting lever is provided with identical balancing weights.

5. Central guide means according to claim 4 wherein said balancing weights depend from said connecting levers and are disposed rearwardly of said fixed pivoting shaft.

6. Central guide means according to claim 3 wherein said connecting levers of both said guide levers are provided with identical balancing weights.

7. Central guide means according to claim 6 wherein said balancing weights depend from said connecting levers and are disposed rearward of said fixed pivoting shaft.

8. Central guide means according to claim 2 further comprising an intermediate guide lever disposed at a second journaling point substantially similar to said first guide lever, said second journaling point lying along said central axis, and an intermediate connecting rod extending between said journaling points.

9. Central guide means according to claim 1 wherein said connecting lever is provided with identical balancing weights.

10. Central guide means according to claim 9 wherein said balancing weights depend from said connecting levers and are disposed rearwardly of said fixed pivoting shaft.

* * * * *

UNITED STATES PATENT AND TRADEMARK OFFICE
CERTIFICATE OF CORRECTION

PATENT NO. : 4,300,405
DATED : November 17, 1981
INVENTOR(S) : Udo Szczepanek

It is certified that error appears in the above—identified patent and that said Letters Patent is hereby corrected as shown below:

Column 3, line 13, "a" should read -- $\underline{a}$ --;
line 14, "b" should read -- $\underline{b}$ --.

Signed and Sealed this

Thirteenth Day of April 1982

[SEAL]

Attest:

GERALD J. MOSSINGHOFF

Attesting Officer

Commissioner of Patents and Trademarks